US005202759A

United States Patent [19]

Laycock

[11] Patent Number: 5,202,759

[45] Date of Patent: Apr. 13, 1993

[54] SURVEILLANCE SYSTEM

[75] Inventor: John Laycock, Alton, United Kingdom

[73] Assignee: Northern Telecom Limited, Montreal, Canada

[21] Appl. No.: 825,531

[22] Filed: Jan. 24, 1992

[30] Foreign Application Priority Data

Jan. 24, 1991 [GB] United Kingdom ................ 9101548

[51] Int. Cl.[5] ................................ H04N 7/18

[52] U.S. Cl. ................................ 358/108; 358/86

[58] Field of Search ................ 358/108, 903, 86, 133; 379/53, 54

[56] References Cited

U.S. PATENT DOCUMENTS

| | | | |
|---|---|---|---|
| 4,511,886 | 4/1985 | Rodriguez | 358/108 |
| 4,876,597 | 10/1989 | Roy | 358/108 |
| 4,951,147 | 8/1990 | Aknar | 358/108 |

*Primary Examiner*—Howard W. Britton

*Attorney, Agent, or Firm*—Lee, Mann, Smith, McWilliams, Sweeney & Ohlson

[57] ABSTRACT

A remote surveillance system includes one or more surveyed stations and a common control station. Each surveyed station includes structure for communication with the control station via telephone line. Each surveyed station further includes video equipment and a data compressor whereby video signals may be converted to a form suitable for transmission to the control station over the telephone line. The control station has a data expander for receiving the video signals.

4 Claims, 4 Drawing Sheets

SURVEILLANCE SYSTEM

This invention relates to surveillance and/or intruder detection systems, and in particular to systems in which information is transmitted from a surveyed location to a remote station.

BACKGROUND OF THE INVENTION

Remote monitoring systems are widely used e.g. for intruder and/or fire detection purposes. In a typical system a locally triggered alarm signal is relayed to the remote station where an operator can then alert the appropriate keyholder or emergency service. One of the problems with such a system is that of spurious triggering of the local detection resulting in false alarm signals. In an attempt to overcome this problem some workers have provided video monitoring of the surveyed premises. Such a technique is described for example in specification No. US-A-4,876,597. In that arrangement single video frames are digitally encoded and stored in a memory for subsequent viewing. There is now a need for more advanced systems that provide full video, e.g. real time video, monitoring of a remote location. However, current systems that provide this facility require the use of a high bandwidth data link, e.g. an ISDN or Magastream Line, to transmit the video signals to the monitoring station. This has restricted use of such a system to those locations where data transmission facilities are available.

It is an object of the invention to minimise or to overcome this disadvantage.

It is a further object of the invention to provide a remote surveillance system in which video signals may be transmitted over the public telephone network.

SUMMARY OF THE INVENTION

According to the invention there is provided a remote surveillance system, including a plurality of surveyed stations and a common control station, first programmable means disposed one at each said surveyed station and second programmable means disposed at the control station, said first and second programmable means being adapted to effect communication between each said surveyed station and the control station via a telephone line, one or more detectors disposed at each said surveyed station, video means disposed at each said surveyed station, data compressors one at each surveyed station and adapted to compress video signals to a form suitable for transmission over a said telephone line to the control station, and a data expander provided at the control station and adapted to receive video signals from compressed data received from a surveyed station, said data compression and expansion being effected via said first and second programmable means respectively, the arrangement being such that activation of a said detector initiates telephone communication between the corresponding surveyed station and the control station whereby to transmit video information to the control station.

BRIEF DESCRIPTION OF THE DRAWINGS

An embodiment of the invention will now be described with reference to the accompanying drawings in which.

DESCRIPTION OF PREFERRED EMBODIMENT

Figure 1:
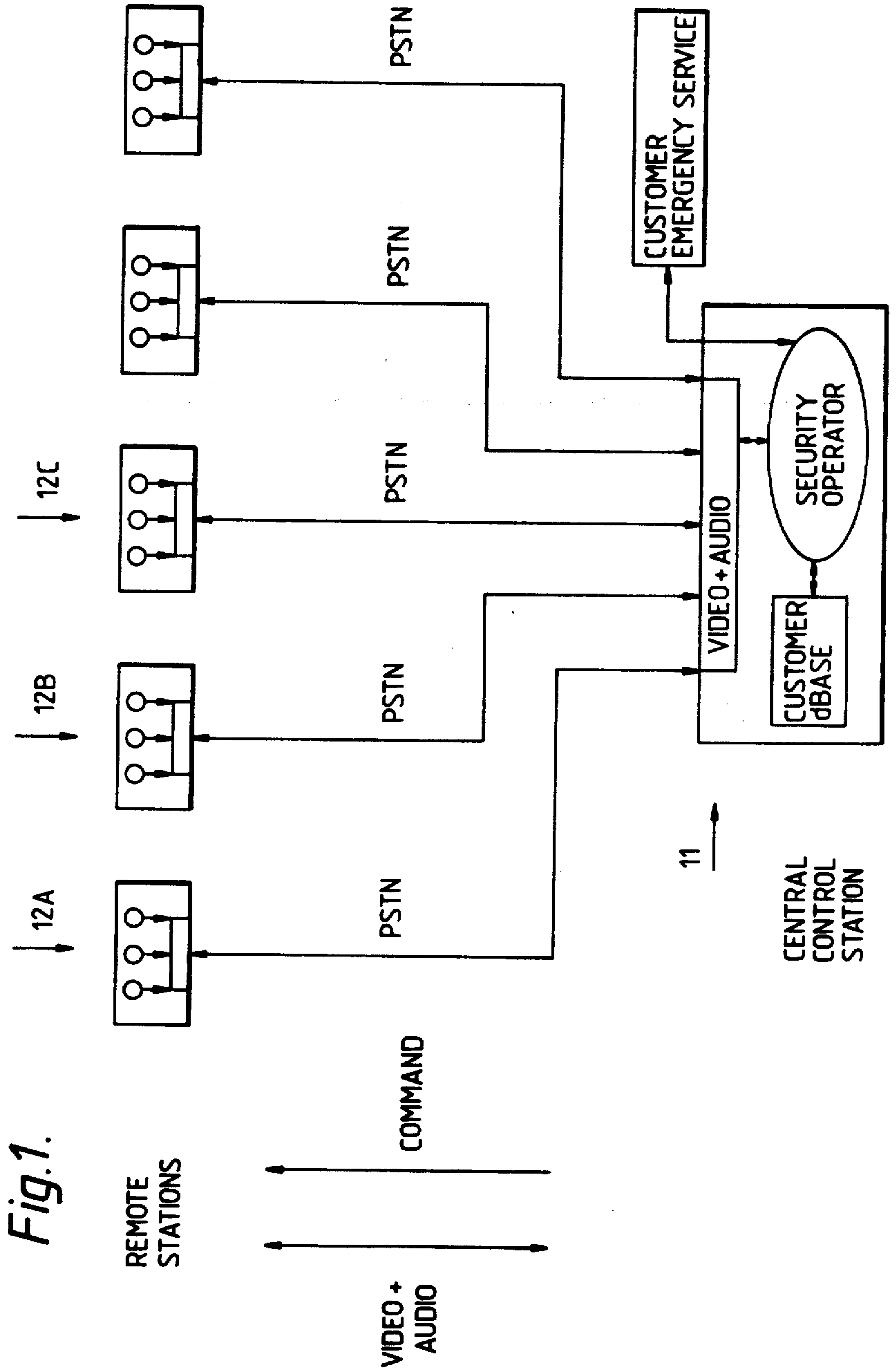
FIG. 1 is a general schematic diagram of a remote surveillance system in which a number of surveyed locations are monitored from a common control station.

Referring to FIG. 1, the surveillance system includes a central control station 11 and a number of remote or surveyed stations 12A, 12B, . . . associated with and controlled by the control station. The surveyed stations 12A, 12B, . . . are linked, when required, to the control station 11 via telephone lines, e.g. via the public switched telephone network (PSTN) or via a private network. When a remote station is connected to the control station, e.g. alarm, audio and video signals may be transmitted over the telephone line to the control station and command signals may be transmitted back from the control station to the remote station. Advantageously, facilities are also provided for transmitting video signals from the control station to the remote station. A speech channel may also be provided for supervisory or maintenance purposes. The transmissions in both directions are effected over the same telephone line. In an alternative arrangement two telephone lines may be employed.

Figure 2:
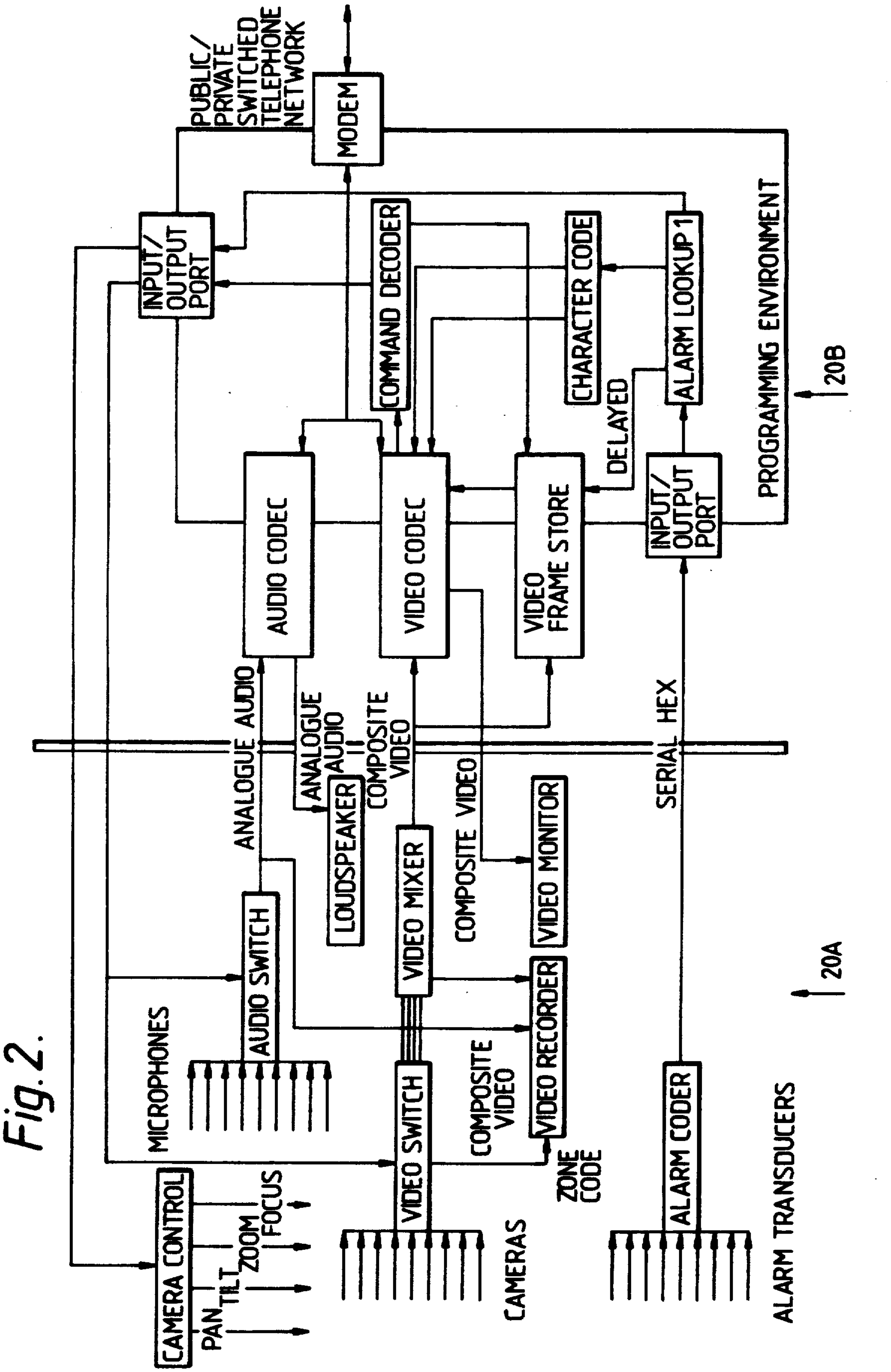
FIG. 2 is a schematic diagram of the monitoring, transmitting and receiving equipment at a surveyed station of the system of FIG. 1.

Referring now to FIG. 2, this shows in schematic form the equipment installed at the supervised station or customer premises. The equipment is divided into two portions namely the supervisory unit 20A and the data processing/line interface unit 20B.

The supervisory unit incorporates one or more alarm transducers or detectors, e.g. to detect a fire or an intruder, and one or more video cameras. One or more microphones may also be provided. Signals for the latter two devices are directed via a corresponding video or audio switch to the interface unit 20B. Signals from the alarm transducers are directed via a coder circuit to the interface unit.

The data processing interface unit provides local control of the supervised station and also provides the means of communication between the supervised station and the control station via a telephone network. This communication may be continuous, or may be activated by operation of a detector or alarm causing the interface unit to dial up the control station whereby to transmit data and video signals thereto. In some applications a plurality of control stations may be provided so that, if the line to one control station is busy or disabled, an alternative control station may be dialled up.

Advantageously the interface unit may be dialled up from the control station to permit the transmission of data and video signals on demand. When connected to a control station the interface unit relays command signals to the audio and video switches. Further command signals may be provided to control the video camera or cameras in response to the signals transmitted to the control station.

The interface unit comprises a computer, e.g. a personal computer, programmed to perform the functions of load control and of processing the various signals.

A particular function of the interface unit is the processing of the video signals to provide a compressed signal suitable for transmission via a modem over a telephone line which is of limited bandwidth. This is effected by storing each successive video frame and comparing that frame with the previous frame to determine which pixels have changed. Signals corresponding to the changed pixels only are transmitted to the control station where the complete video information is then recovered. This provides a very significant economy of the amount of information to be transmitted over the telephone line. Further data compression may be achieved by transmitting the signal e.g. in a differential pulse code modulation (DPCM) format. These techniques reduce the signal bandwidth very significantly and allow the provision of dynamic rather than slow scan video.

In addition to the above functions, the interface unit 20A also transmits an identifier signal code which indicates to the control station the identity of the surveyed station currently in communication and the type and location of the activated transducer. In some applications a 'handshake' procedure may be provided to reduce the risk of unauthorised access to the system e.g. by a 'hacker'.

Figure 3:
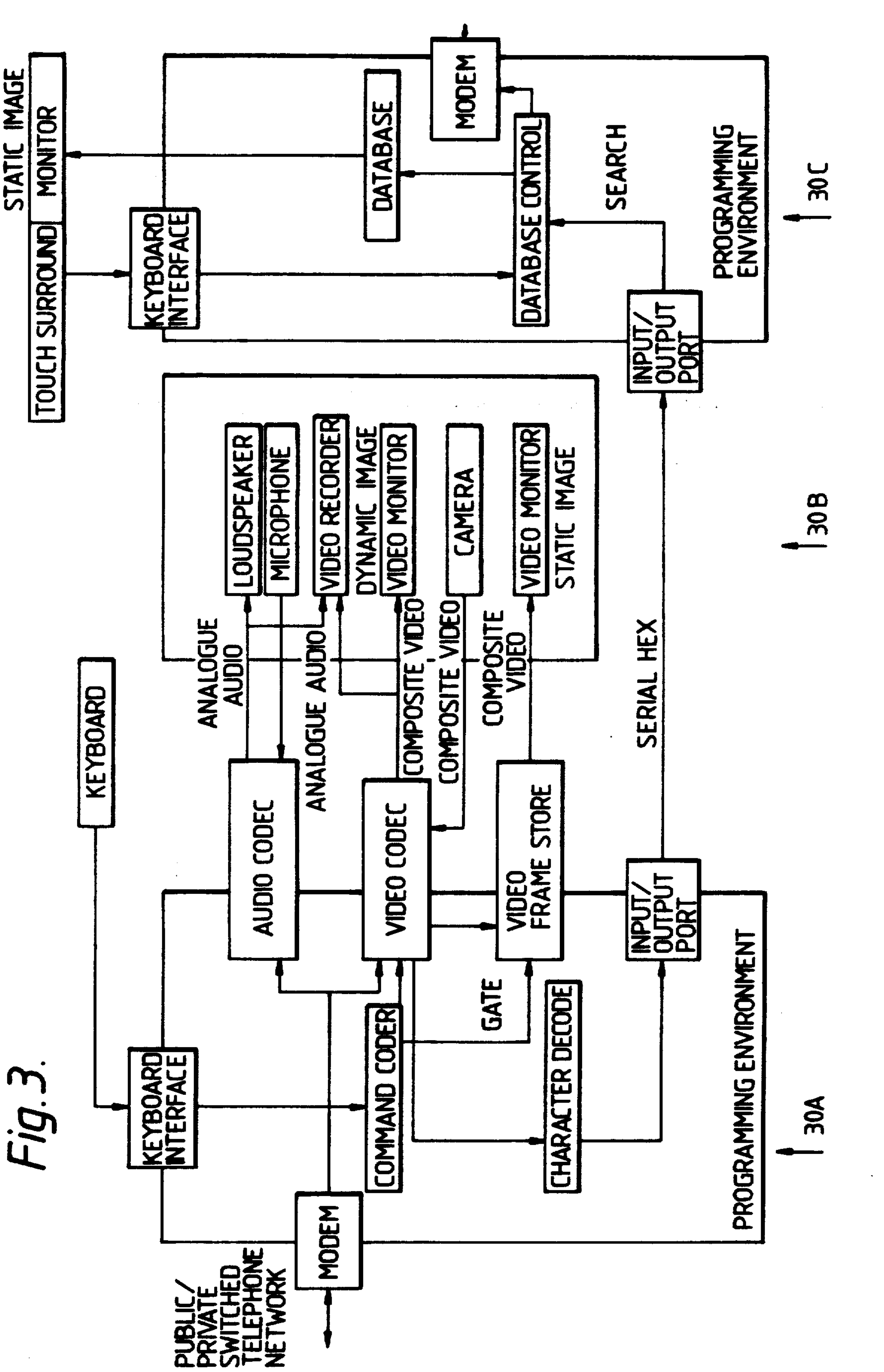
FIG. 3 is a schematic diagram of a control station receiving and transmitting equipment.
Figure 4:
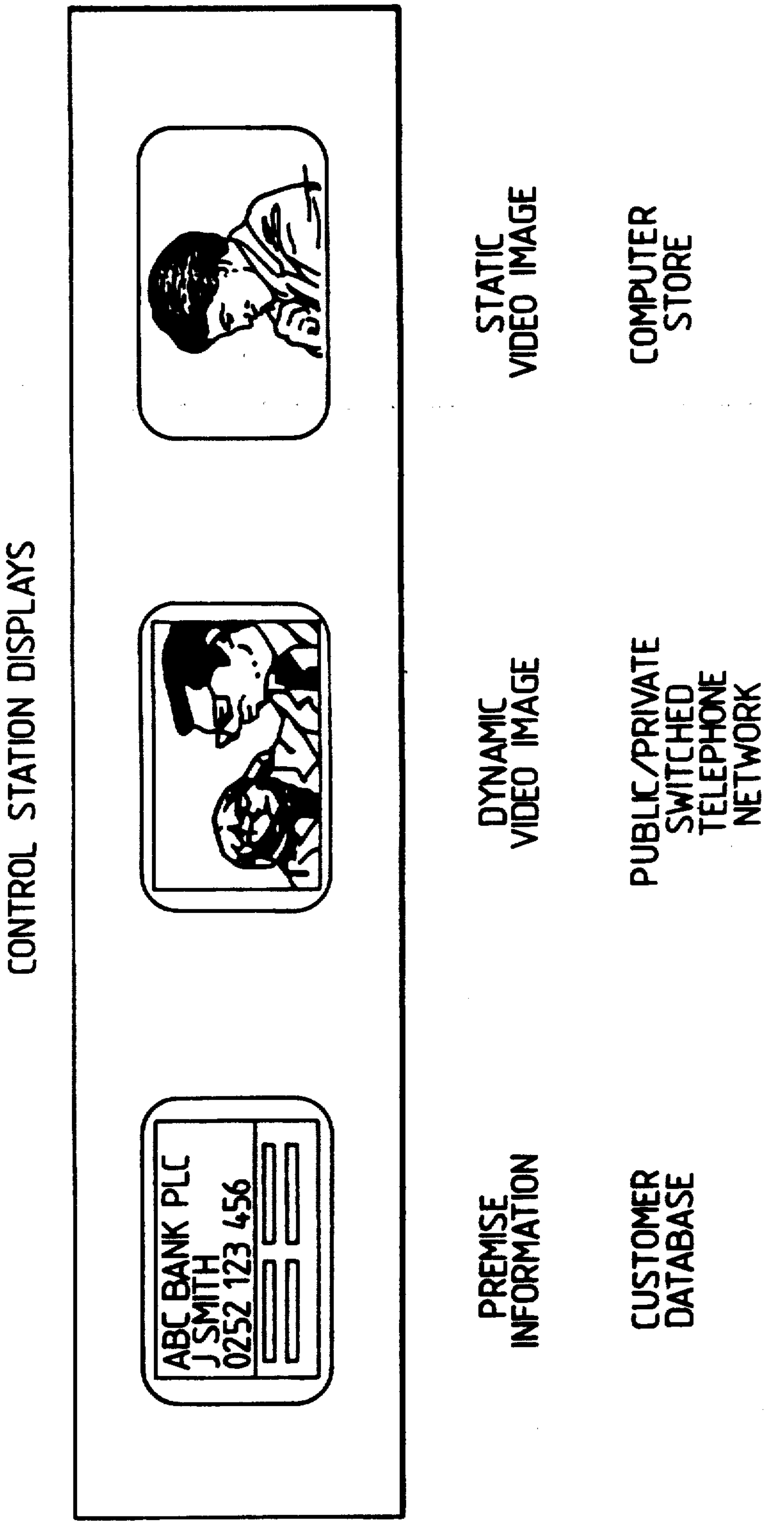
FIG. 4 illustrates a typical control station display equipment.

Referring now to FIGS. 3 and 4, the control station includes a line interface unit 30A, an operator/display unit 30B and a storage or database unit 30C. It will be appreciated that one database unit may service a plurality of control stations. The line interface 30A communicates via a telephone line with the line interface units of the surveyed stations to receive audio and video information from incoming signals. The interface unit also decodes the customer identifier code so that the appropriate customer information can be retrieved from the database.

The line interface unit 30A comprises a computer, e.g. a personal computer, and provides both a control function for the control system and an interface, via a modem coupled to a telephone line, with the surveyed stations. The computer is programmed to perform inter alia the functions of decoding incoming video, audio and alarm signals, the decoded signals being fed to the operator/display unit. The computer also processes command or interrogation signals that are to be transmitted to the surveyed stations. In some applications data encryption may be employed for communication between the control station and the surveyed stations.

The display unit 30B provides video displays (FIG. 4) to an operator and provides keyboard facilities for the operator input of commands via the interface unit to the surveyed station.

The control station may response to an incoming dialled call from a surveyed station, or it may initiate contact with a surveyed station e.g. for maintenance or supervisory purposes.

In some applications the control station may effect programming of the computer associated with a surveyed station, e.g. to provide system updating. This is of potential advantage as it substantially eliminates the need for site visits by programming staff.

The database unit 30C may also comprise a personal computer provided e.g. with disk drive back-up for storage of the various system and customer details.

The following is a description of a typical operating sequence following activation of an alarm at a surveyed location or customer premises.

THE TRANSMIT PROCESS FOR THE CUSTOMER PREMISES

One of the group of alarm transducers is tripped by e.g. an intruder or an outbreak of fire. Via the alarm coder, a serial hex signal is derived indicating the type and location of the transducer. The serial signal of the alarm coder is transmitted to an input/output port 20B where the signal is detected and an interrupt is initiated.

Within the interface unit, the alarm lookup decodes the incoming serial string and from a customer-specific lookup table derives the type and location of the alarm transducer. The output from the lookup process is passed to three further processes, namely, character code video frame store control and RS232.

From the data derived in the alarm lookup within the character code process a code is produced which includes data in the following order: a unique code for the location of the customer premises (preferably the telephone number), the alarm location within the premises, the type of alarm the time and date. The output of the character code process is passed to the video codec for inclusion as a legend on the video signal portion of the PSTN transmission. In addition, the code is passed to the video codec where, at the commencement of broadcast it is emitted as a serial string for decoding at the control station.

The alarm lookup derives signals which are sent in rapid succession via the input/output port of the interface unit to the video and audio switches. In this manner the appropriate signals for the zone in which the alarm has occurred are directed to the inputs of the audio and video codecs.

The video switch simultaneously receives composite video inputs from all the cameras positioned around and within the Customer premises. The control signal from the input/output port 20B selects a single signal, or up to four signals, from the alarms area. These signal/s is/are passed to the video mixer. The relationship between control signal in and desired outputs is stored in the video switch. The video switch also generates a code denoting the zone where the alarm has occurred and adds this to the video output.

The outputs from the video switch are mixed to provide one by whole-screen, two by half-screen or four by quarter-screen output. The output is a single composite video signal. The composite video is passed to the input of the video codec and simultaneously to a permanently running video recorder.

The output from the input/output port also gates the audio switch in a similar manner to that adopted for the video switch. From the multiple microphone inputs a single output is selected which corresponds with the alarmed zone.

The analogue audio output is passed to the input of the audio codec for onward transmission as part of the PSTN signal. Simultaneously, the analogue audio signal is passed to the audio input of the video recorder to permit an audio archive record to be obtained.

The video frame store receives the composite video output of the video mixer. The video frame store is continuously refreshed until a signal is received from the alarm lookup or a remote command is transmitted from the control station via the command decoder to 'freeze' the contents. The output from the store is fed, on demand from the control station, to the video codec for onward transmission to the control station via the modem.

The signal from the alarm lookup to the video frame store is a delayed trigger. The delay duration is set to permit the alarm lookup operation and video switching and mixing to be completed prior to the store operation. In this way the store contains the image from the alarmed zone and not the inappropriate image received at the instant when the alarm is initiated.

The video codec receives the composite video from the output of the video mixer. To the composite video is added the information output from the character code process.

The combined video output of the codec is interleaved with the output of the audio codec for onward transmission down the telephone line.

The audio codec receives the analogue audio signal from the output of the audio switch.

The audio output of the codec is interleaved with the output of the video codec for onward transmission down the telephone line which is dialled up by the interface unit via the modem.

THE RECEIVE PROCESS AT THE CONTROL STATION

The incoming signals carrying coded information about location of customer premises, location of alarm, alarm type, time and data plus interleaved video and audio signals are passed to the single input of the video codec and audio codec for processing.

Signals received by the audio codec represent digitally compressed analogue audio from the microphone output of the alarmed zone within the customer premises. These signals are processed in the audio codec and passed to the loudspeaker and the audio channel of the video recorder.

The video codec receives signals from the modem. The first signals received by the video codec contain information about location of customer premises, location of alarm, alarm type, time and date. This information is routed to the character decode process.

The subsequent video signals are processed and passed from the output of the video codec to the video recorder, a 'dynamic image' monitor, and the video frame store.

The video frame store continuously receives the output from the video codec and passes its output to the 'static' image monitor. The frame store captures the first image that is transmitted as the result of an alarm and automatically inhibits any store update until the operator intervenes. A manual command may be entered via the operator keyboard and the frame store refreshed under the control of a signal emanating from the command coder process.

Within the interface unit a simple lookup table is used to interpret incoming single key commands from the keyboard interface and route them to either the video frame store or the video codec.

The first signals received from the video codec contain information about location of customer premises, location of alarm, alarm type, time and date. This information is automatically detected and the information is passed to the character decode process for treatment. The character decode separates out the five elements of data and routes them, e.g. as a serial stream of data, to the database. Commands entered via the keyboard and related interface pass to the command coder for transmission on to the customer premises via the video codec.

In transmission mode the audio and signal codecs pass the coded information from the keyboard along with video and audio signals to the customer premises.

THE RECEIVE PROCESS AT THE CUSTOMER PREMISES

Signals transmitted from the control station over the telephone network are received on the customer premises via the modem and are passed to the audio and video codecs. The audio codec passes the digital signals derived from the microphone of the central station to the loudspeaker.

The command decoder recognises any incoming command signals being received via the video codec. For control signals initiating switched activities, the interface unit issues a coded command through the input/output port to a macro activated within the programming environment to activate the appropriate peripheral equipment e.g. camera zoom. The video codec also passes the digital signals derived from the camera of the control station.

It will be appreciated that, whilst the surveillance system has been described above with particular reference to security applications, it is by no means limited to those application. For example, the system may be employed in a supervisory function in a transport system. Such a system may provide monitoring and control of vehicle movements and may also identify congestion points so that remedial action may be taken.

I claim:

1. A remote survelllance system, including a plurality of surveyed stations and a common control station, first programmable means disposed one at each said surveyed station and second programmable means disposed at the control station, said first and second programmable means being adapted to effect communication between each said surveyed station and the control station via a telephone line, one or more detectors disposed at each said surveyed station, video means disposed at each said surveyed station, data compressors one at each surveyed station and adapted to compress video signals to a form suitable for transmission over a said telephone line to the control station, and a data expander provided at the control station and adapted to receive video signals from compressed data received from a surveyed station, said data compression and expansion being effected via said first and second programmable means respectively, the arrangement being such that activation of a said detector initiates telephone communication between the corresponding surveyed station and the control station whereby to transmit video information to the control station, wherein means are provided for transmitting an identifier code from a surveyed station to the control station at the commencement of communication therebetween, and wherein said control station has data compressor means for transmitting video signals to one or more said surveyed stations, said surveyed stations having data expander means for removing said video data.

2. A system as claimed in claim 1, wherein the control station incorporates a data base adapted to provide information relating to each said surveyed station.

3. A system as claimed in claim 2, wherein said first and second programming means and said data base comprise each a computer.

4. A system as claimed in claim 3, wherein each said first programming means is programmable by said second programmable means via a telephone line therebetween.

* * * * *